No. 627,337. Patented June 20, 1899.
A. KHOLODKOWSKY.
SAFETY JOINT FOR AIR BRAKES.
(Application filed Dec. 6, 1898.)
(No Model.) 2 Sheets—Sheet 1.
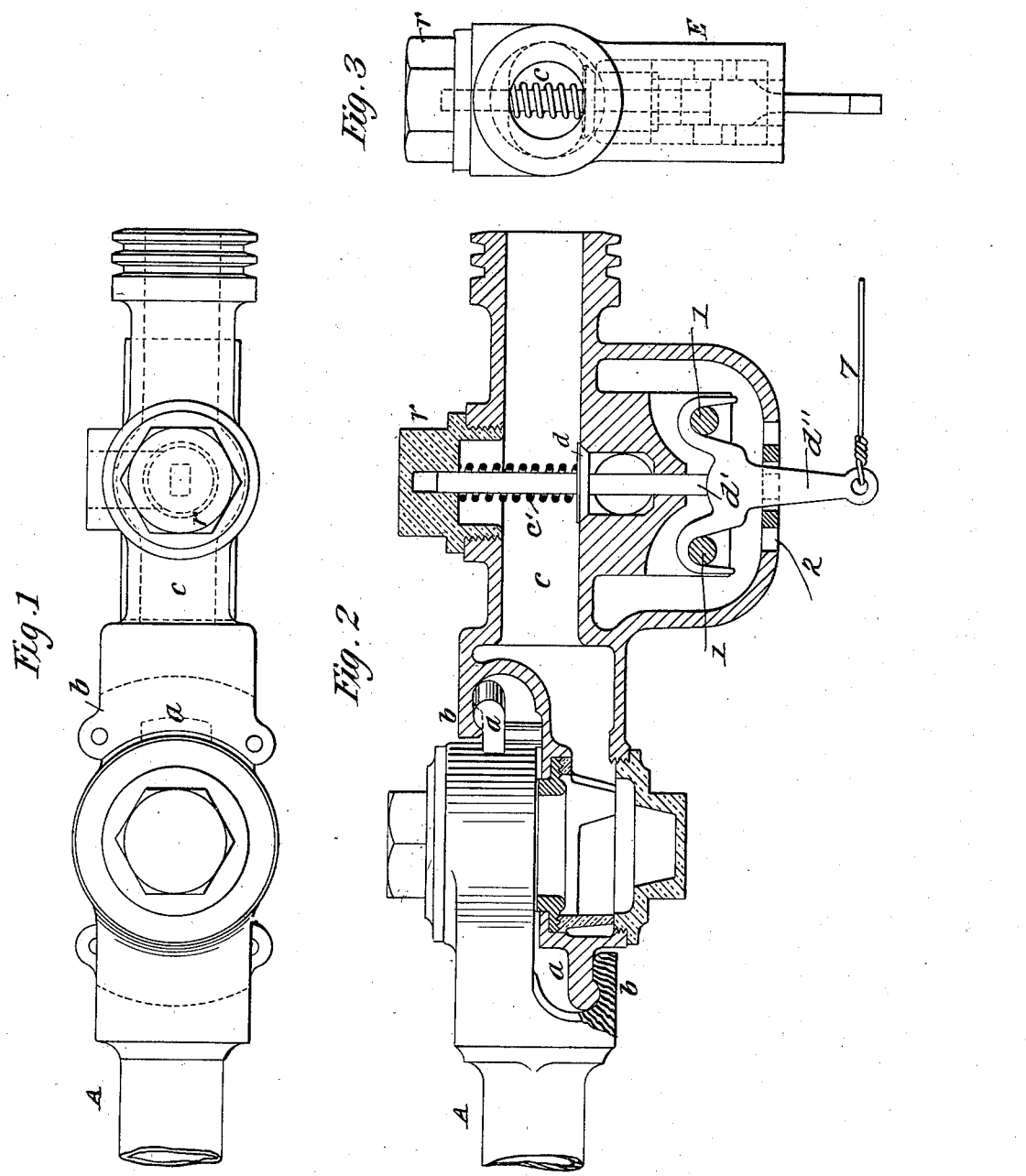
WITNESSES: INVENTOR.
André Kholodkowsky,
BY
ATTORNEY.

No. 627,337. Patented June 20, 1899.
A. KHOLODKOWSKY.
SAFETY JOINT FOR AIR BRAKES.
(Application filed Dec. 6, 1898.)
(No Model.) 2 Sheets—Sheet 2.

WITNESSES:
Raphaël Netter
C. Holloway
H. C. Pinckney

INVENTOR.
André Kholodkowsky,
BY J. E. M. Bowen
ATTORNEY.

UNITED STATES PATENT OFFICE.

ANDRÉ KHOLODKOWSKY, OF KISHENEV, RUSSIA.

SAFETY-JOINT FOR AIR-BRAKES.

SPECIFICATION forming part of Letters Patent No. 627,337, dated June 20, 1899.

Application filed December 6, 1898. Serial No. 698,414. (No model.)

*To all whom it may concern:*

Be it known that I, ANDRÉ KHOLODKOWSKY, a subject of the Emperor of Russia, and a resident of Kishenev, Russia, have invented certain new and useful Improvements in Safety-Joints for Air-Brakes, of which the following is a specification.

My arrangement of safety-joint for air-brakes is illustrated in the accompanying drawings, in which—

Figure 4:
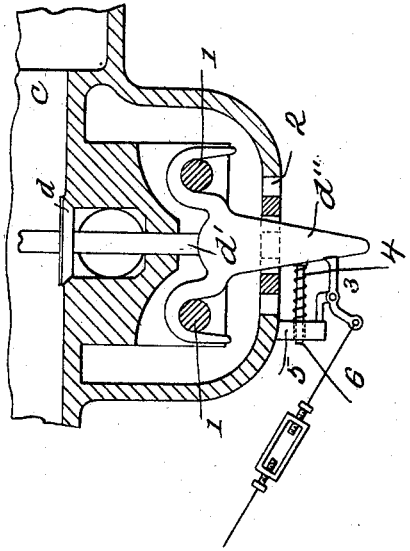

Figure 1 is a plan view of one form of my apparatus. Fig. 2 is a partial central vertical section, and Fig. 3 an end view thereof. Fig. 4 is a partial central section of a modification, and Fig. 5 is a diagrammatic view showing the connection of operating-wires.

A are pipes such as commonly secured to the bottoms of cars and forming part of car-brake apparatus.

$a\ b$ are the interlocking flanges of a pipe joint or connector to connect the meeting flexible hanging ends of the pipes between adjoining cars.

Figure 5:
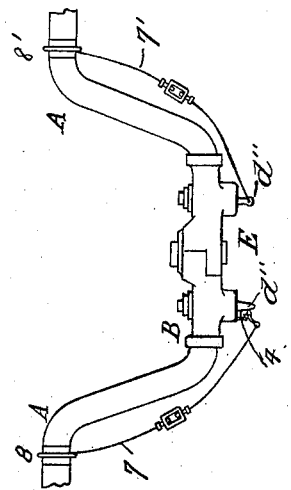

When the pipes of two cars are connected, they will hang between cars about as shown in Fig. 5. Such joints cannot be separated to disconnect the pipes while the pipes thus hang downward; but the joint must be raised before the joint can be separated. I connect alongside of the pipe-joint a valve-box, consisting of a section of tube $c$, provided with a plug $r$, into which extends a valve-rod of valve $d$, which normally closes communication between air-pipes A $c$ and the outside atmosphere.

The apparatus may be used with different systems—for example, the system operating brakes by exhausting air from the pipes or in the system using pressure in the pipes. In the first case the connected pipes A will be connected to the vacuum reservoir or pump. In the second case they will be connected with the air-pressure device.

In Figs. 1, 2, and 3 an arrangement of valves is shown suitable for a vacuum system. Valve $d$ is held closed by a coiled spring $c'$, strong enough to resist the air-pressure on the outside of the valve. The valve-stem $d'$ is continued by the valve and terminates at the valve-operating lever $d''$, which is hung on pins 1 and which extends through slot 2, in which it has a limited swinging movement, when lever $d''$ is turned on either pin 1 as a pivot. Means for automatically operating said lever will be hereinafter described. It will be understood that pipe A, Fig. 2, is the air-brake pipe of one car and that the end of pipe $c$ remote from the joint will be connected to the similar pipe of an adjoining car, this latter pipe being omitted from said figure.

In Fig. 4 the valve $d$ is suitable for use in a brake system using pressure apparatus, the valve $d$ in this case being normally closed by the air-pressure in the pipes. The parts 1 2 $d'\ d''$ are the same as in Fig. 2; but in Fig. 4 the valve-operating lever $d''$ is acted upon by a contractile spiral spring 4, one end of which is connected to said lever and the other end is connected to bracket 5. 6 is a pin within the spring and adapted to slide through the bracket. The lever $d''$, and hence the valve also, is normally held from movement under the influence of spring 4 by the pivoted bent stop-lever or locking device 3; but when lever 3 is turned out of the way spring 4 turns lever $d''$ and opens valves $d$, causing air to be drawn from the pipes. I do not confine myself to the exact form of spring and locking-lever device shown. It is only necessary that the spring should tend to operate the valve and that the locking device should restrain it until wire 7 is pulled.

From the foregoing it will be clear that the valve shown in Fig. 2 will be opened (and brakes applied) by a pull on the bottom of lever $d''$, while the valve of Fig. 4 will be opened by a pull on the locking device 3.

7 is a wire, chain, or the like, adjustable in length and connected directly to the lever $d''$ or to the locking device, as already described. Wire 7 is led from such connection to a fixed part of pipe A at or near the downward bend and secured thereto, as at 8. Wire 7 should be of such length that when the tubes and joint hang in normal condition the valve $d$ will be in the position which it occupies when the brakes are out of action, and this condition should continue under all normal movements of the joint caused by normal approach or recession of the cars to or from each other; but when such normal movement is exceeded the wire 7 should be put under tension and a pull automatically exerted, thereby causing valve $d$ to open, thus insuring the quick application of the brakes on the occurrence of such abnormal conditions.

I have thus far described a single valve $d$ and a single wire 7 in connection with the meeting pipes A; but for greater certainty of operation two valves and two wires may be used, the second being marked 7' 8'. By mere omission of one of the wires 7 or 7' in Fig. 5 the single-wire arrangement would be indicated. E in Fig. 5 indicates the joint or coupling between pipes A A.

When two valves are used, one may be like that shown in Fig. 2, as indicated at the right in Fig. 5, and the other like that shown in Fig. 4, as indicated at the left in Fig. 5; but it is not necessary that the valves should be different.

I claim—

1. The combination of car-brake pipes A, A, a valve $d$, adjacent to the end of one of said pipes in the flexible hanging end of one of said pipes, an operating device for the valve, a wire connected to such operating device and to a fixed part of the pipe, as at 8, as and for the purpose described.

2. The combination of a car-brake pipe A secured beneath a car and having a flexible hanging end adapted to be connected to a similar pipe on another car, a valve in pipe A, a valve-operating device, and a wire connected to said device, and to a fixed part on the same car as said pipe A and of such length as to operate the valve, as set forth.

3. The combination with car-brake pipes A, A, a connecting device between them, a valve $d$, adjacent to the connecting device, a spring, 4, tending to open the valve to apply the brakes, a locking device restraining said spring, and a wire 7 connected to the locking device and to a relatively-fixed point of support.

In witness whereof I have hereunto set my hand in presence of two witnesses.

ANDRÉ KHOLODKOWSKY.

Witnesses:
 THOMAS E. HEENAN,
 THOMAS MILES.